(No Model.)
R. P. CHAPMAN.
GRIDIRON.
No. 363,590. Patented May 24, 1887.
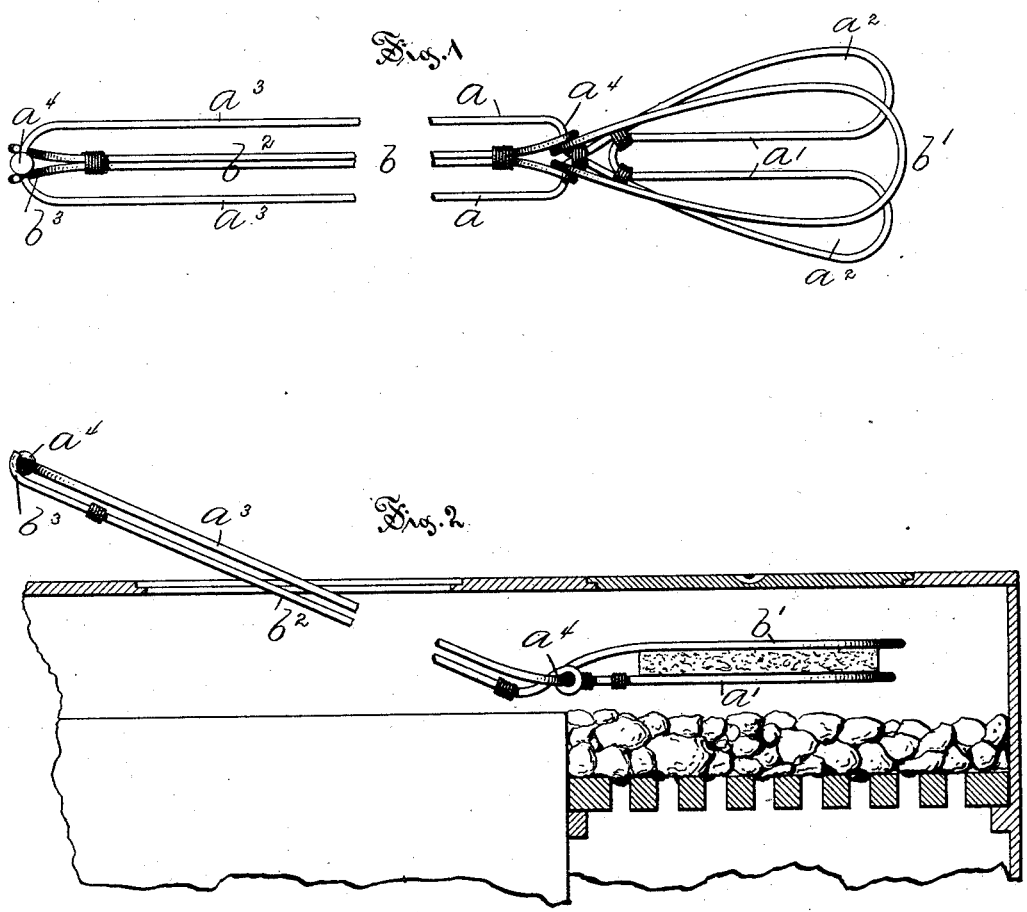

UNITED STATES PATENT OFFICE.

RUSH P. CHAPMAN, OF HARTFORD, CONNECTICUT.

GRIDIRON.

SPECIFICATION forming part of Letters Patent No. 363,590, dated May 24, 1887.

Application filed April 14, 1886. Serial No. 198,856. (No model.)

*To all whom it may concern:*

Be it known that I, RUSH P. CHAPMAN, of Hartford, in the county of Hartford and State of Connecticut, have invented certain new and useful Improvements in Broilers and Toasters, of which the following is a full, clear, and exact description, whereby any one skilled in the art to which it appertains can make and use the same.

My within improvement relates to the class of devices that are used to hold meat, bread, or like edibles while broiling or toasting over the fire; and its object is to provide an improved device of this class that is much cheaper and simpler in construction and much handier of operation.

My improvement consists in a broiler made of a pair of wire levers bent to form loop-jaws that are at an angle with the handles of the levers, the bend being at or near the connecting-pivot bearing, and in details in the construction and combination of the parts, as more particularly hereinafter described, and pointed out in the claims.

Referring to the accompanying drawings, Figure 1 is a plan view of a toaster embodying my improvements. Fig. 2 is a side view of the same, illustrating the method of using it and one of its advantages.

The device illustrated in the accompanying drawings is composed of two levers made of wire bent to shape, with loop-form jaws extending forward of the pivot-point, and handles extending rearward of that point, the letter $a$ denoting one of the levers, with a jaw, $a'$, formed of broadened loops $a^2$, and having the handle $a^3$ made in the shape of an oblong frame, and standing at an angle of about thirty degrees with the plane of the jaw $a'$. The adjacent points of the several loops are fastened together in any convenient manner—as by twisting the wires, soldering, or by a lashing of smaller wire—the crosswise part of the frame near the angle forming the pivot $a^4$, upon which the lever $b$ is supported. The lever $b$ is likewise of wire bent to shape, with a jaw, $b'$, bent preferably to the form of a broadened loop, with its sides overlying the spaces of the loops $a^2$, and having the handle part $b^2$ bent at a similar angle with the plane of the jaw, as in the case of the lever $a$.

The end of the handle $b^2$ is bent to form a spring-catch, $b^3$, that engages the end of the handle $a^3$ when the parts are pressed together; and in the form shown this spring-catch is formed by the forked ends of the handle being bent upward and engaging the sides of an enlargement, $a^5$, on the end of the handle $a^3$.

The device is used for broiling and toasting, preferably the latter; and the precise shape and size of the holding-jaws are not material to my improvement, nor is the precise angle between the plane of the jaws and the plane of the handles.

The method of using the device is apparent, and, it is thought, needs no explanation to enable any one to use it.

Fig. 2 of the drawings illustrates one advantage due to the angular relation of the handles and jaws, the main advantage being due to the fact that the surface of the article being toasted may be held in a plane parallel to the surface of the fire and a more even result obtained without removing more than one of the covers of the stove, and thus preventing the deadening of the fire while broiling or toasting.

I am aware that it is not new to provide a device for broiling or toasting articles that has a handle extending in a different plane from the article-support, such being shown in patents to Smith, No. 265,164, of September 26, 1882; Willging, No. 134,410, of December 31, 1872, and others, and such I do not broadly claim.

I claim as my improvement—

1. The combination of the levers $a$ and $b$, each formed of wire, with the respective looped jaws $a'$ and $b'$ and handles $a^3$ and $b^2$, the latter extending rearward of the pivotal connections of the levers with each other, the said pivot being formed by the loop in one of the levers that encircles the pivot-bar $a^4$ of the other lever, all substantially as described.

2. In combination, the levers $a$ and $b$, each formed of wire and pivotally connected together by an integral loop in one of the levers encircling the pivot-bar of the other lever, each lever having the loop-jaws, that extend forward of the pivot, and the handles, that extend rearward of the pivot, the said handles lying in a plane at an angle with the holding-jaws, and the spring-catch $a^5$, whereby the levers are held closed together, all substantially as described.

RUSH P. CHAPMAN.

Witnesses:
 JAS. E. SMITH,
 H. R. WILLIAMS.